United States Patent [19]
Spencer

[11] Patent Number: 5,152,973
[45] Date of Patent: Oct. 6, 1992

[54] SYNTHESIS OF SUBMICRON POWDERS UNDER REDUCED OXYGEN PRESSURE

[75] Inventor: Nicholas D. Spencer, Washington, D.C.

[73] Assignee: W. R. Grace & Co.-Conn., New York, N.Y.

[21] Appl. No.: 520,695

[22] Filed: May 8, 1990

[51] Int. Cl.$^5$ ............... C01B 31/24; H01L 39/12
[52] U.S. Cl. .................. 423/419 P; 423/419 R;
423/420; 423/21.1; 423/35; 423/158; 423/165;
252/518; 252/521; 505/1; 505/737; 505/738
[58] Field of Search ............. 505/1, 737, 738;
423/419 R, 419 P, 420, 21.1, 35, 158, 165;
252/518, 521

[56] References Cited

U.S. PATENT DOCUMENTS

| | | | |
|---|---|---|---|
| 3,582,266 | 6/1971 | Sopp et al. | 423/632 |
| 4,163,735 | 8/1979 | Fetchin et al. | 423/419 P |
| 4,693,986 | 9/1987 | Vit et al. | 501/153 |
| 4,764,357 | 8/1988 | Sherif et al. | 423/593 |
| 4,839,339 | 6/1989 | Bunker et al. | 505/1 |
| 4,863,521 | 9/1989 | Block | 505/1 |
| 4,898,851 | 2/1990 | Michel | 505/1 |
| 5,002,926 | 3/1991 | Spencer et al. | 505/1 |

FOREIGN PATENT DOCUMENTS

| | | |
|---|---|---|
| 669388 | 8/1963 | Canada . |
| 0306973 | 3/1989 | European Pat. Off. . |
| 0306974 | 3/1989 | European Pat. Off. . |

OTHER PUBLICATIONS

*Perry's Chemical Engineers Handbook* pp. 20-54-20-57, 1987.

Johnson et al.; "Fabrication of Ceramic Articles from High $T_c$ Superconducting Oxides", High Temp. Supercond., Apr. 23-24, 1987.

Wakata et al.; "The Superconducting Properties of La-Sr-Cu-O Systems", Low Temp. Physics, Aug. 20-26, 1987.

Fujiki et al.; "Preparation of a High $T_c$ Y-Ba-Cu-O Superconductor Using Colloidal Methods", Jrnl of App. Physics, 6(7), Jul. 1987 L1159-6.

Kishio et al., "Effect of Residual Water on Superconductivity in $(La_{1-x}Sr_x)$ $CuO_{4-\delta}$ ", Jap. Jrnl App. Phys vol. 26, No. 4, pp. L466-L467, Apr. 1987.

U. Balachandran et al., "Synthesis of Phase-Pure Orthorhombic $YBa_2CU_3O_x$ Under Low Oxygen Pressure" in Materials Lett., 8, 454 (1989).

U. Balachandran et al., "Synthesis of 80 K Superconducting $YBa_2CU_4O_8$ Via a Novel Route" in Physica C., 165, 335 (1990).

*Primary Examiner*—Paul Lieberman
*Assistant Examiner*—Bradley A. Swope
*Attorney, Agent, or Firm*—Steven Capella

[57] ABSTRACT

The invention process provides a metal oxide, or oxides of more-than one more metal, wherein the oxides have a mean particle size less than 1 micron. The oxides are made by steps including (1) reacting an aqueous solution of a metal salt (or salts) that form insoluble carbonate(s), thereby to form a carbonate precipitate, followed by (b) recovering the precipitate, e.g., by filtration; (c) redispersing the precipitate in water to form a second very dilute slurry; (d) spray-drying said second slurry; (e) calcining the spray-dried product at a low temperature (e.g., 540° C.), followed by a final calcination in atmosphere consisting of flowing oxygen initially under reduced pressure (e.g., 2 Torr). The spray-dried spheroids comprise particles having a mean particle size less than one micron, a property carried over into the products of both calcinations.

11 Claims, 4 Drawing Sheets

SYNTHESIS OF SUBMICRON POWDERS UNDER REDUCED OXYGEN PRESSURE

RELATED APPLICATIONS

The following deal with precipitating metal carbonates using quaternary ammonium carbonate solution:

U.S. Ser. No. 155,340, filed Feb. 12, 1988, now U.S. Pat. No. 5,149,682.
U.S. Ser. No. 201,988, filed Jun. 3, 1988, now U.S. Pat. No. 5,002,926.
U.S. Ser. No. 219,677, filed Jul. 15, 1988, now abandoned.
U.S. Ser. No. 237,268, filed Aug. 26, 1988, now U.S. Pat. No. 5,023,067.
U.S. Ser. No. 324,482, filed Mar. 16, 1989, now U.S. Pat. No. 5,001,109.
U.S. Ser. No. 417,603, filed Oct. 5, 1989, now U.S. Pat. No. 4,997,810.

All are assigned to the same assignee as the instant application.

FIELD OF THE INVENTION

The invention relates to improvements in the preparation of metal oxides.

SUMMARY OF THE INVENTION

Metal oxides having a volume median particle size less than 1 micron are made by steps including (1) reacting an aqueous solution of a metal salt (or salts) that form insoluble carbonate, thereby to form a carbonate precipitate, followed by (b) recovering the precipitate, e.g., by filtration; (c) redispersing the precipitate in water to form a dilute second slurry; (d) spray-drying said dilute second slurry; (e) calcining the spray-dried product at a low temperature (e.g., 540° C.), followed by a final calcination in an atmosphere consisting of flowing oxygen under reduced pressure (e.g., 2 Torr), at a temperature sufficiently high to form the desired metal oxide, but not so high as to cause the product to agglomerate into particles that have a volume median particle size about 1 micron. The product of steps (d) and (e) has a volume median particle size less than 1 micron, typically averaging about 0.75 micron. The extremely theoretical density. Y-Ba-Cu oxides where the Y:Ba:Cu atomic ratio is 1:2:3 or 1:2:4 made with the new submicron materials provide higher current densities ($J_C$) than most similar prior products. The submicron powders of the invention are useful in making ceramics and superconductors, including superconducting thin films and in screen printing superconducting applications.

As used herein, "volume median particle size" means that half the particles by volume have sizes below the stated size, and the other half above that size. "Submicron particle" means that the particle measures less than 1 micron in its largest dimension.

BACKGROUND OF THE INVENTION

A paper by U. Balachandran et al (Argonne National Laboratory), "Synthesis of Phase-Pure Orthorhombic $YBa_2Cu_3O_x$ Under Low Oxygen Pressure" in Materials Lett., 8, 454 (1989) discloses milling a mixture of $Y_2O_3$, $BaCO_3$, and CuO in methanol; drying and screening the resultant slurry; and calcining the screened powders for 4 hours in flowing $O_2$ with a pressure of 2-20 mm Hg and at a temperature of 800° C. The product was cooled under flowing $O_2$ at ambient conditions, with a 3-hour hold at 450° C. to promote oxygenation of the resulting powder. Under optimum conditions ($2.7 \times 10^2$ Pa which is 2 mm Hg) the powders were phase pure. Particle size was 1-4 microns. Pellets sintered in $O_2$ at 915°–980° C. gave densities of 90-96% of theoretical.

In a related paper U. Balachandran et al describe the preparation of $YBa_2Cu_4O_8$ by a similar process: "Synthesis of 80 K Superconducting $YBa_2Cu_4O_8$ Via a Novel Route" in Physica C., 165, 335 (1990).

Similar powders made by the process of the instant invention provide densities at least as high as those of Balachandran, but made at considerably lower temperatures (typically 700°–750° C.). The ability to achieve $YBa_2Cu_3O_x$ at lower temperatures is believed to result both from the much smaller volume median particle size (i.e., submicron versus 1-4 microns for the Balachandran product), and the much greater homogeneity of products of the invention process.

DETAILED DESCRIPTION OF THE FIGURES

In all Figures, particle size distribution was determined by laser-light scattering. Percentages are by volume. The graphics were computer-generated, based on the raw data obtained.

Figure 1:
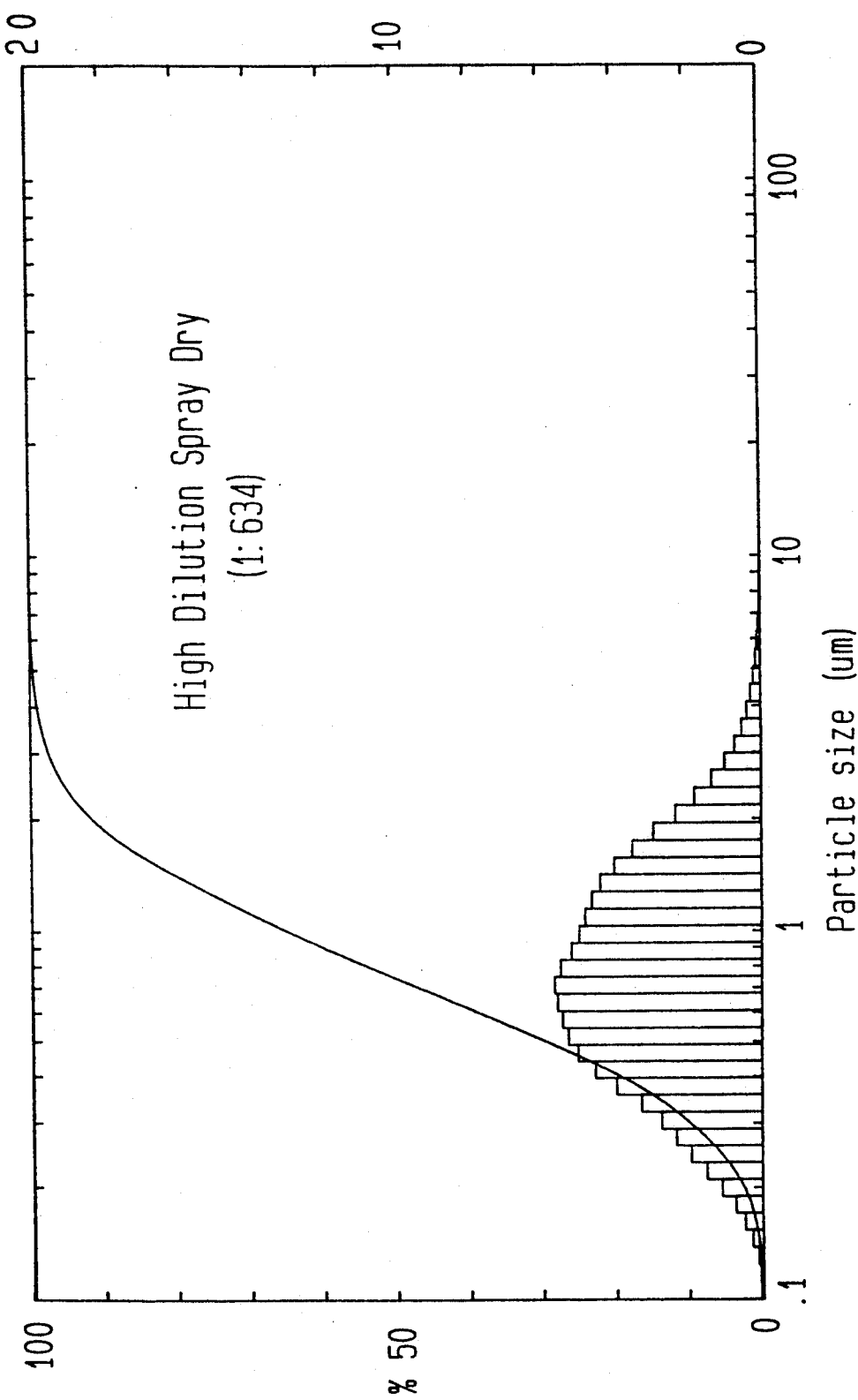
FIG. 1 shows a particle size distribution for the oxide product of Example 1.

FIG. 1 shows particle size distribution of the Y-Ba-Cu oxide product made in Example 1 (the invention).

Figure 2:
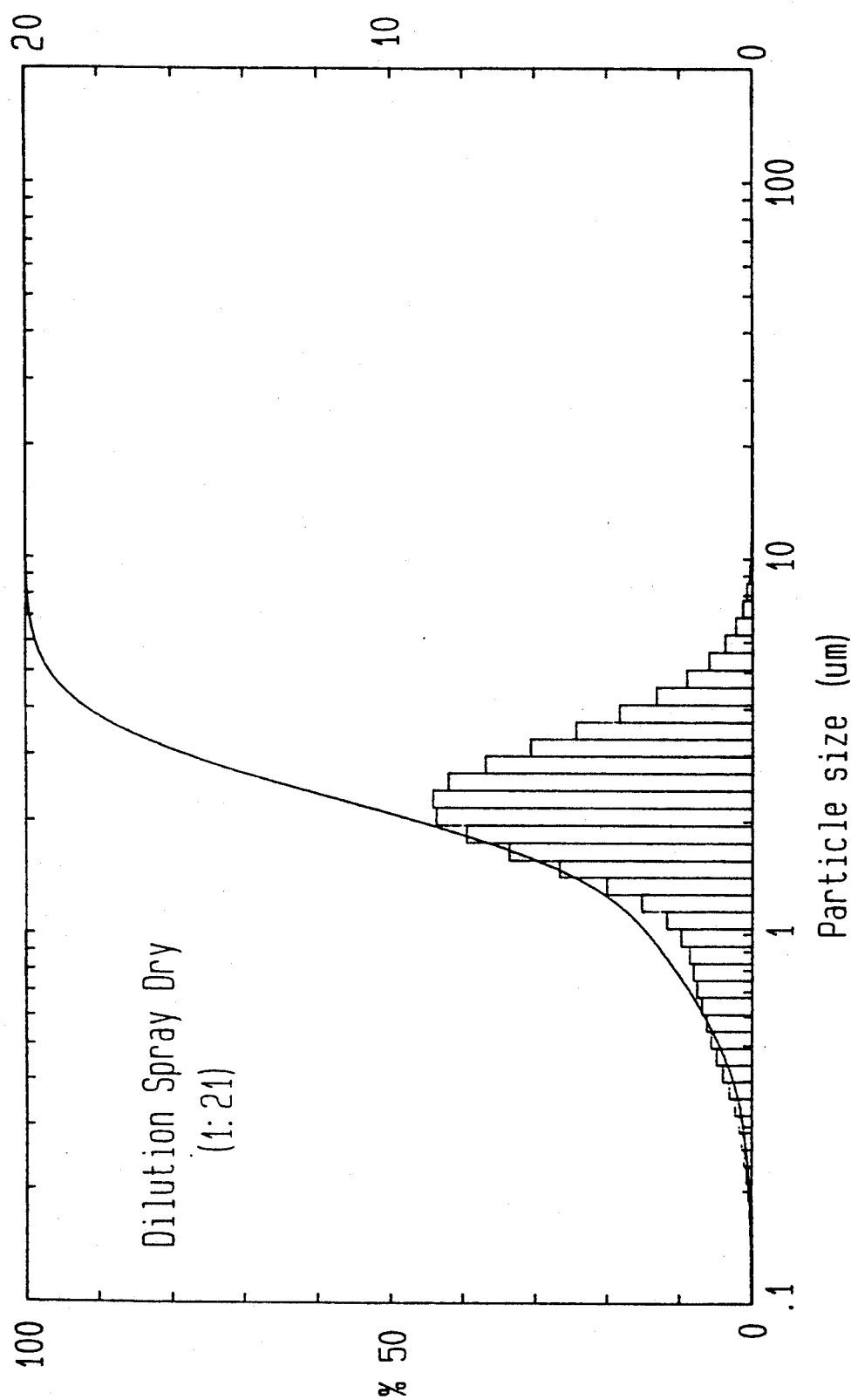
FIG. 2 shows a particle sized distribution for a comparison example.

FIG. 2 (not the invention) shows particle size distribution of a Y-Ba-Cu oxide product made by the same process as in Example 1, except that the ratio of carbonate:water in the re-slurry step was about 1:21, and the product was precalcined for 5 hours at 540° C. in air, then calcined on a tray for 36 hours under 1 atmosphere of oxygen at 890° C. The volume median particle size was about 3.28 micron.

Figure 3:
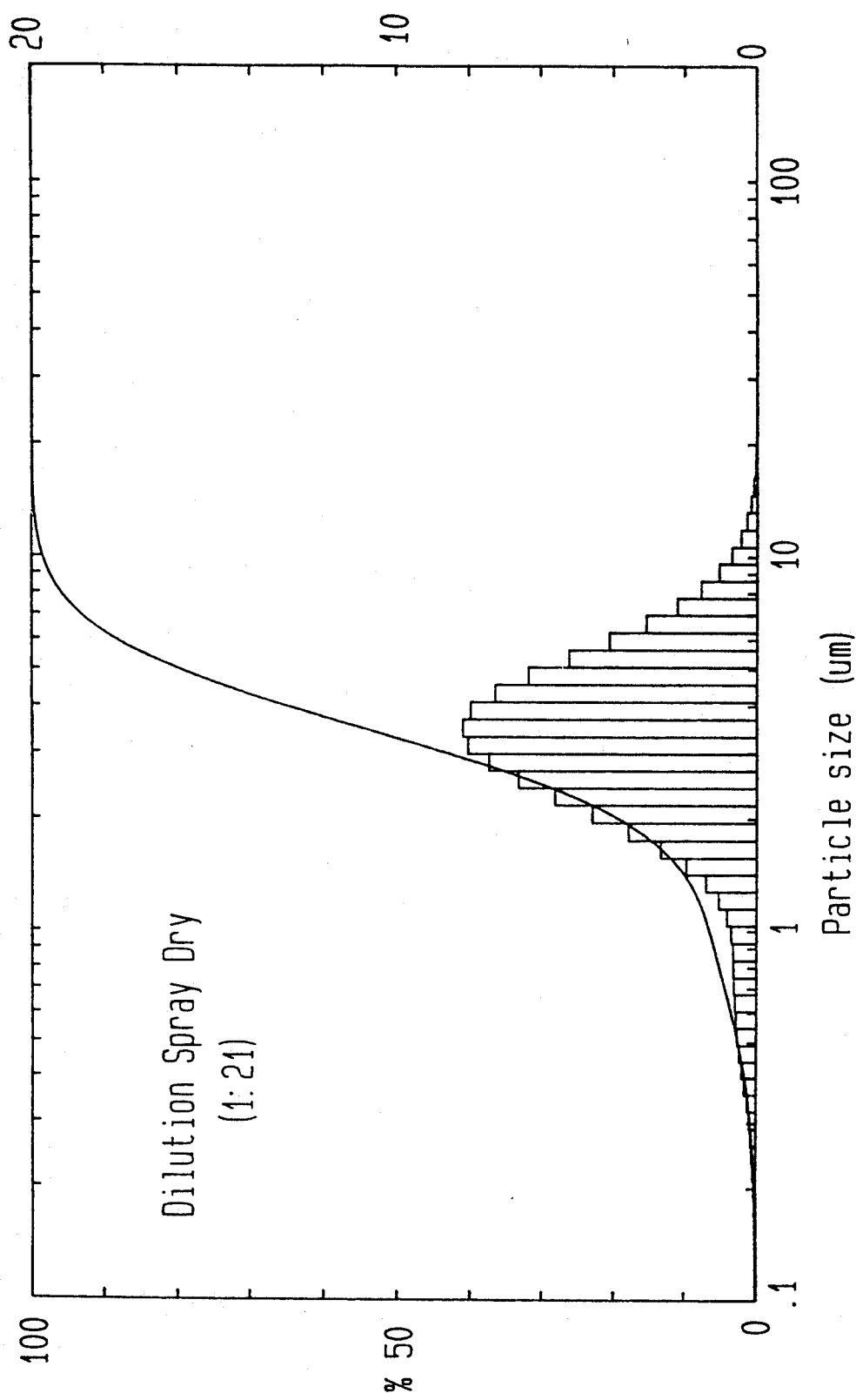
FIG. 3 shows a particle size distribution for an additional comparison example.

FIG. 3 (not the invention) shows particle size distribution for spray-dried Y BazCu: carbonate reslurried and processed substantially as described in Example 1, except that on reslurrying, the g:ml ratio of theoretical carbonate:water was 1:21. Volume of submicron particles was about 15%. Specific surface area was 4.0235 $m^2/cm^3$. Volume median particle size was about 2.09 microns.

Figure 4:
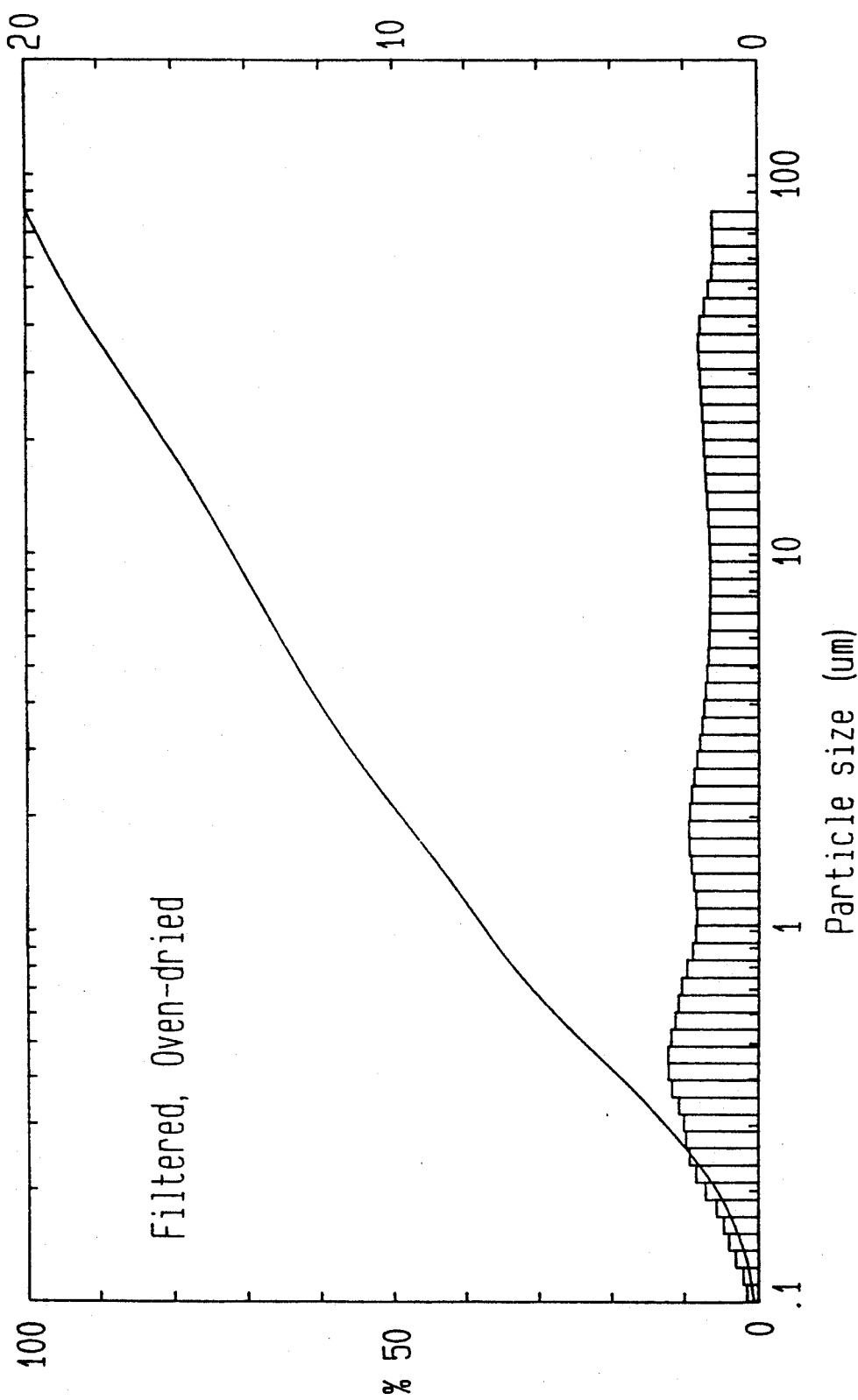
FIG. 4 shows a particle size distribution for a third comparison example.

FIG. 4 (not the invention) shows distribution for product prepared as in Example 1, except that, after filtering, the product was not reslurried, but was oven-dried and the cake was broken and particle size distribution determined at that stage. The volume of particles below 1 micron was found to be about 24%, and specific surface area 5.34 $m^2/cm^3$. Calcination was the same as in FIG. 2.

The results of the runs of the four Figures are summarized in Table 1.

TABLE 1

Effect of Certain Variables on Particle Size Distribution

| FIG. | V.M.P.S.[a] | Dilution[b] | Surface Area[c] | Separation/drying | Calcination |
|---|---|---|---|---|---|
| 1 | 0.74 | 1:634 | 10.12 | S-D[d] | 2 Torr/$O_2$, 750° C.[e] |
| 2 | 3.28 | 1:21 | 2.64 | S-D[d] | 1 atm. $O_2$, 890° C.[f] |
| 3 | 2.09 | 1:21 | 4.02 | S-D[d] | (e) |
| 4 | 3.45 | not diluted | 5.34 | Filtration[g] | (f) |

All were precalcined, before calcination: at 5 hours at 540° C. in air
[a]Volume median particle size, microns.
[b]Ratio, theoretical carbonate:water, in g/ml.
[c]In $m^2/cm^3$
[d]S-D = spray dried.
[e]Tube furnace; for complete schedule see Example 1.
[f]Calcined on a tray for 36 hours under 1 atm. $O_2$ at 890° C.
[g]Filter cake not reslurried and not spray-dried.

Referring more particularly to FIG. 1, the bars (right hand scale) show volume fraction (percent) of a given particle size and the curve (left hand scale) shows accumulative percents. For example, the volume fraction of "0.93 micron" material is seen to be about 5%; and total material of 0.93 micron size and below is 61.4%. Total volume of particles 1 micron and below is seen to be about 66%.

DETAILED DESCRIPTION OF THE INVENTION THE GENERAL PROCEDURE

Precipitating the Carbonate

To precipitate the carbonate, one or more water-soluble salts of the carbonate-forming metal or metals are dissolved in water, and a quaternary ammonium carbonate is added, while maintaining the pH of the reaction mixture at about 7.5-12. The pH is conveniently maintained by the addition of a quaternary ammonium hydroxide. The resulting precipitate may contain some hydroxide; the hydroxide is not an impurity and does not interfere with the precipitation or the subsequent steps. This type of precipitation is described in more detail in, e.g., U.S. Ser. No. 155,340, filed Feb. 12, 1988, above referenced. Example 1 below is similar to Example 1 of U.S. Ser. No. 155,340 as regards formation of the carbonate precipitate, except that U.S. Ser. No. 155,340 uses tetraethylammonium carbonate as the precipitant. An analogous precipitation technique is described in U.S. Pat. No. 4,839,339, Bunker et al, Jun. 13, 1989, and gives a precipitate suitable for use in this invention.

Preparation of Quaternary Ammonium Carbonate

A solution of quaternary ammonium carbonate is conveniently prepared by bubbling $CO_2$ through an aqueous solution of a quaternary ammonium hydroxide until the quaternary carbonate is stoichiometrically formed and $CO_2$ is dissolved in excess. The preferred quaternary ammonium hydroxides have the formula:

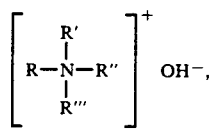

where R, R', R", R'" are the same or different members of the group.

i) alkyl, e.g. tetramethylammonium, tetraethylammonium, tetrapropylammonium, dimethyldiethylammonium, cyclopropyltrimethylammonium and the like;
ii) aromatic, e.g. phenyltrimethylammonium, phenylethyldimethylammonium benzyltrimethylammonium, and the like.;
iii) heterocyclic;
iv) and any two group members may be joined in a ring whereby N becomes a ring member, e.g., dimethyl pyrrolidinium, dimethylpyridinium, and the like.

The Metal Salts

The invention process is a general one and is applicable to any metals (a) that provide water-soluble salts (nitrates, acetates, etc.) and (b) which form water-insoluble carbonates. The carbonates in various instances are actually the basic carbonates, subcarbonates, etc. It makes no difference, the important thing being water-insolubility. Here again it should be borne in mind that all carbonates are to some extent water-soluble. Those that are very sparingly soluble are intended for use in this invention, e.g., those having solubilities roughly comparable to the carbonates of the alkaline earth metals.

Some of the preferred metals (that have insoluble carbonates, as the term is used herein) are:

(1) The rare earths, i.e., elements with atomic numbers 57-71 inclusive.
(2) Alkaline earth metals (Be, Mg, Ca, Sr, Ba).
(3) Cu, Ag.
(4) Mn, Fe, Co, Ni.
(5) Zn, Cd, Hg.
(6) Pb, Bi.
(7) Sc, Y.
(8) Zr.

An aqueous solution of metal salts is made up by dissolving their nitrates or other water-soluble salts in water. The metal atomic ratios will depend on the end use intended. Typically, any given metal may be present in an atomic ratio of 1-100, suitably 1-10, with respect to any other metal. However, when it is desired to introduce very small amounts of a given metal, this ratio will vary accordingly.

A preferred aqueous solution of the metal salts (as herein defined) is made up by dissolving their nitrates or other water-soluble salts in water, so as to provide a predetermined atomic ratio (e.g., if aiming at a superconductor, yttrium nitrate, barium nitrate, and copper nitrate may be dissolved in water so that yttrium, barium, and copper ions are present in the solution in a ratio of substantially 1:2:3 or 1:2:4).

For use in making a superconductor, I prefer at least one trivalent metal (i.e. valence of +3) such as yttrium or bismuth, preferably selected from yttrium, scandium, and the other rare earth group elements (elements with atomic numbers 57-71); with at least one bivalent metal (i.e. valence of +2) such as Ba or Sr, and is preferably selected from the group Ba, Be, Mg, Ca, and Sr; and at least one metal of multiple valency (i.e. more than one valence state) such as Cu or Nb, preferably selected from the group Cu and Ag.

I prefer Y, Ba, and Cu in a atomic ratio of 1:2:3 or 1:2:4. This results in an amount of oxygen in the calcined product equal to about 7 (or a little less) atoms per atom of Y.

The Co-carbonate Slurry

The solutions of quaternary ammonium carbonate and metal salt or salts are now added slowly, simultaneously, at constant rates, with stirring, to a pool ("heel") of deionized water. This pool is the reaction medium for the carbonate co-precipitation reaction, and the eventual result is a carbonate slurry. The two solutions and the heel are suitably each about the same starting volume. The pH should be maintained at about 7.5 or above, suitably between 7.5 and 12, during co-precipitation. For example, the pH of the reaction mass may be maintained at about 9 by drip-wise addition of a quaternary ammonium hydroxide. The precipitated carbonates can be recovered from the slurry using various techniques. On a laboratory scale simple filtration followed by air drying the precipitate is adequate for good homogeneity.

When the carbonate precipitation is complete, the resulting slurry consists essentially of
  i) metal carbonates according to the invention, about 0.5-75 wt. %;
  ii) quaternary ammonium cations, about 0.1-75 wt. %;
  iii) anions residual from the starting salts, stoichiometrically equivalent to the metal carbonates; and
  iv) balance, water The filtered precipitate recovered from this slurry is generally friable and easily crumbled.

Recovering the Precipitate

The carbonate precipitate is recovered by filtration or the equivalent. In the laboratory, simple filtration through filter paper, with or without reduced pressure, is appropriate. On a larger scale, various commercial filters are available, e.g., rotary drum filters, rotary disk filters, traveling belt filters, leaf filters, etc. These filters typically provide a cake easily washed, and which may contain a few percent of water. This residual water is not harmful and may actually facilitate reslurrying the cake in the next step. Instead of filtration, centrifugation may be used.

The filter cake in many cases may not be pure carbonate; minor amounts of hydroxides may be present, together with water of hydration as well as adherent water.

The filter cake product at this point for Y-Ba-Cu carbonate is well known in the art. It has a submicron volume median particle size and can be precalcined (e.g., at 540° C.) and fired (e.g., at 900° C.+) to make a superconductor, but volume median particle size of the fired particles will be greater than 1 micron. To maintain volume median particle size below one micron the filter cake must be processed as further described herein, starting with reslurrying the cake.

Reslurrying the Carbonate Precipitate

This step is essential. The amount of water in which the filter cake is reslurried is important. The ratio in g. of theoretical carbonate to ml of water should be about 1:300-1500, and preferably about 1:500-700. By theoretical carbonate I mean the product obtained as if all the dissolved metal ions were precipitated as carbonate. This is a theoretical value, since some of the metals do not precipitate exclusively as pure carbonate, as above explained. However, the amount of theoretical carbonate is very useful in determining the amount of water to be used in reslurrying the precipitate.

Theoretical carbonate is readily determined. Table 2 shows calculations for determining theoretical carbonate for Example 1. First one determines the moles of metal contained in the soluble metal salts used. Then, one multiplies those figures by the molecular weight of the cabonate for the respective metal to determine the weight of metal carbonate that would be formed if complete conversion to the carbonate occurred. Referring to yttrium nitrate in the table below, 4.56 grams of the nitrate contain 0.012496 moles of yttrium. The molecular weight for yttrium carbonate ($\frac{1}{2}Y_2(CO_3)_3$) is 178.92. Therefore, the theoretical amount of yttrium carbonate that could be produced is 2.236 grams. Similar calculations can be used for other solutions that yield carbonate precipitates, e.g., $Y_1Ba_2Cu_4$ carbonates, $La_1Ba_2Cu_3$ carbonates, etc. As noted, theoretical carbonate in Example 1 was 11.805 g, and the g:ml ratio for the reslurrying liquid was 11.804:7,500, or 1:635.

TABLE 2

Calculation of Theoretical Carbonate In Example I

| | Nitrate g | Mol. Wt. | Moles Metal (g/mol. wt.) | Theoretical Carbonate |
|---|---|---|---|---|
| $Y(NO_3)_3 \cdot 5 H_2O$ | 4.56 | 364.92 | 0.012496 | 2.236 |
| $Ba(NO_3)_2$ | 6.53 | 261.38 | 0.024983 | 4.930 |
| $Cu(NO_3)_2 \cdot 2\frac{1}{2} H_2O$ | 8.73 | 232.57 | 0.037537 | 4.638 |
| Theoretical carbonate | | | | 11.804 |

Spray-drying the Reslurried Carbonate

A bench scale spray dryer, a Yamato Model GS 21 with a GF-31 attachemnet, made by Yamato U.S.A. Inc. Northbrook, IL was used. In this unit the atomizer operated with compressed nitrogen, and air preheated to about 140°-165° C. was used in the drying chamber. The collecting pot, which operated on a cyclone principle, vented to the hood. As an alternate to the conventional nebulizer in a spray drier, an ultrasonic device can be used in order to obtain smaller droplets and, therefore, finer spray-dried particles. The spray-dried product as such is considered to have a volume median particle size below 1 micron.

Commercial-scale spray dryers are recommended for larger operations. A variety is available, but all are based on two essential functions: (1) the feed is atomized; and (2) the atomized feed is dried in a stream of hot gas. Atomizers take various forms. The two most frequently found are the centrifugal-wheel - where the feed is flung as a fine spray from a rapidly whirling disk; and the pressure-nozzle atomizer (rather like a garden hose nozzle sprayer). The aim of course is to produce particles such that the largest will be completely dried during its retention time in the hot-gas chamber, where gas flow may be co- or counter- to particle flow. All of these considerations are well within the routine skill of the spray-drying art. (Cf. the article, Spray Drying, in Van Nostrand's Scientific Encyclopedia, 6th Ed., 2657-2658[1983].)

Spray-drying aqueous solutions of metal salts is known. See, e.g., Y-Ba-Cu monocarboxylates in U.S. Pat. No. 4,863,521 issued Sept. 5, 1989, Block, and Y-Ba-Cu nitrates in U.S. Ser. No. 095,084, filed Sept. 11, 1987, Spencer et al. However, so far as I am aware, no one has previously spray-dried a carbonate precipitated, filtered, and reslurried in the manner herein described. These steps taken in combination give mini-spheroids consisting of clusters of carbonate particles wherein the particles have a volume median particle size less than one micron.

Preliminary Calcination (Pre-calcination)

Residual water and quaternary ammonium compounds are preferably removed by pre-calcining the filter cake at a temperature in the range of about 500°-600° C. in air for about 3-10 hours. This temperature range is high enough to produce an intimate mixture of $Y_2O_3$, $BaCO_3$, and CuO. An ordinary electric furnace can be used. I prefer precalcining at about 540° C. for about 5 hours.

Calcining the Precalcined Product Under Reduced $O_2$/Pressure

A furnace was assembled from readily available "off-the-shelf" items. Basically it included an inlet with an oxygen source (an $O_2$tank), a flow controller, and an electrically-heated quartz tube furnace exiting to a down-stream mechanical pump. Between furnace exit and pump were, in sequence a pressure gauge to monitor oxygen pressure, a valve permitting venting to air, a variable conductance valve, a line valve, another pressure gauge, and, just before the pump, a flow trap (molecular sieves). The pump fluid should be inert to oxygen. A material commercially available as "Krytox" was used. A platinum collar was painted around the outside middle of the furnace to stop direct radiation of the heating element onto the charge. The powders to be heated were placed in an alumina boat and (1) heated in an atmosphere consisting of oxygen at about 0.2-20 Torr, preferably about 2 Torr, from the room temperature to a temperature of about 650°-750° C. (preferably about 700° C.) over a period of about 5-10 (preferably about 7) hours. Next, (2) heating is continued under reduced pressure of oxygen, i.e., about 0.2-20 Torr (preferably about 2 Torr), while increasing the temperature by about 25°-100° C. over a period of about 3-8 hours (preferably about 5 hours), up to a temperature sufficiently high to form, but not so high as to cause the product to agglomerate into particles that have a volume median particle size above 1 micron. (3) The furnace is held at this upper temperature (which is preferably about 5 750° C.) for $YBa_2Cu_3O_x$ where x is about 6 under about 0.2-20 Torr oxygen, for about 2-8 (preferably about 4 hours), after which (4) it is allowed to cool in oxygen at atmospheric pressure down to about 300°-400° C. (preferably about 350° C.) over a period of about 5-15 (preferably about 6 hours), and (5) thereafter allowed to cool to room temperature under 1 atmosphere of oxygen. The volume median particle size of the particles so made is less than 1 micron, and the specific area of the product as determined by laser light scattering is at least about 10 $m^2/cm^3$.

The following example illustrates without limiting the invention.

EXAMPLE 1—$YBa_2Cu_3$ Oxide

The following were dissolved in 250 ml deionized water:
4.56 g. $Y(NO_3)_3.5H_2O$
6.53 g. $Ha(NO_3)_2$
8.73 g. $Cu(NO_3)_2.2\frac{1}{2}H_2O$ 5 ml concentrated $HNO_3$ was added to aid dissolution.

125 ml tetramethylammonium carbonate (pH=10) was diluted to 250 ml using deionized water.

The nitrate solution and the tetramethylammonium carbonate solution were added slowly over a thirty-minute period into a 250 ml heel of deionized water. Reaction mixture pH was maintained at about 9 by addition of neat tetramethylammonium hydroxide (30 ml required). The slurry was aged an additional 30 minutes, then filtered using two No. 5 Whatman filter papers. The filter cake, a Y-Ba-Cu co-carbonate, was not washed.

The semi-wet filter cake was reslurried in 7500 ml deionized water. The pH of the new slurry was 8.6. The weight of the filter cake, dry basis, and calculating all the nitrates as carbonates, would be about 12.2 g, and the ratio of g. of theoretical carbonates to water to make the new slurry would be about 1:(7500/11804), or 1:635.

The new slurry was spray dried in Yamato unit above described, as follows:

| | |
|---|---|
| Outlet temperature: | 60-80° C. |
| Inlet temperature: | 140-165° C. |
| Aspirator setting: | 7-8 cubic feet/min. |
| Total volume of slurry to spray dry, 1.10 liter. | |
| Time required: | 2 hours, 25 minutes. |

The slurry was royal purple in color; the spray-dried powder was light blue.

The spray dried material was pre-calcined at 540° C. for 5 hours. A portion, of this pre-calcined material was then calcined in the oxygen furnace described above, using the following schedule, starting at room temperature:

1. 7 hours to 700° C., under 2 Torr oxygen.
2. 5 hours to 750° C., under 2 Torr oxygen.
3. Hold 4 hours at 750° C., under 2 Torr oxygen.
4. Cool 8 hours down to 350° C., under 1 atmosphere of oxygen.
5. Allow to cool to room temperature, under 1 atmosphere of oxygen.

The result was a fine powder with a volume median particle size less than 1 micron. The complete particle size distribution is given numerically in Table 3 and is shown graphically in FIG. 1.

The powder was phase-pure as shown by x-ray diffraction tests, and was superconducting at a temperature at least as high as 77° K. A pellet pressed from the powder and submerged in liquid nitrogen levitated a small rare earth magnet. (Meissner effect.)

TABLE 3

Particle Size Distribution of Final Product of Example 1

| Size µms. | Vol. % under | Size µms. | Vol. % under | Size µms. | Vol. % under | Size µms. | Vol. % under |
|---|---|---|---|---|---|---|---|
| 0.10 | 0.1 | 0.55 | 33.9 | 2.98 | 97.5 | 16.3 | 100 |
| 0.11 | 0.2 | 0.61 | 39.4 | 3.32 | 98.2 | 18.1 | 100 |
| 0.12 | 0.3 | 0.68 | 45.0 | 3.69 | 98.7 | 20.1 | 100 |
| 0.14 | 0.4 | 0.75 | 50.7 | 4.10 | 99.1 | 22.4 | 100 |
| 0.15 | 0.7 | 0.83 | 56.2 | 4.56 | 99.4 | 24.9 | 100 |
| 0.17 | 1.2 | 0.93 | 61.4 | 5.07 | 99.6 | 27.7 | 100 |
| 0.19 | 1.9 | 1.03 | 66.4 | 5.64 | 99.7 | 30.8 | 100 |
| 0.21 | 3.0 | 1.15 | 71.2 | 6.27 | 99.8 | 34.2 | 100 |
| 0.23 | 4.6 | 1.28 | 75.9 | 6.97 | 99.9 | 38.1 | 100 |
| 0.26 | 6.5 | 1.42 | 80.3 | 7.75 | 99.9 | 42.3 | 100 |
| 0.29 | 8.9 | 1.58 | 84.4 | 8.62 | 100 | 47.1 | 100 |
| 0.32 | 11.6 | 1.75 | 87.9 | 9.58 | 100 | 52.3 | 100 |
| 0.36 | 14.9 | 1.95 | 90.9 | 10.7 | 100 | 58.2 | 100 |
| 0.40 | 18.9 | 2.17 | 93.2 | 11.8 | 100 | 64.7 | 100 |
| 0.44 | 23.5 | 2.41 | 95.1 | 13.2 | 100 | 71.9 | 100 |

TABLE 3-continued

| Particle Size Distribution of Final Product of Example 1 | | | | | | | |
|---|---|---|---|---|---|---|---|
| Size μms. | Vol. % under | Size μms. | Vol. % under | Size μms. | Vol. % under | Size μms. | Vol. % under |
| 0.49 | 28.6 | 2.68 | 96.4 | 14.6 | 100 | 80.0 | 100 |

It is understood that the foregoing detailed description is given merely by way of illustration and that many variations may be made therein without departing from the spirit of this invention.

I claim:

1. In a process of preparing a metal carbonate precipitate by reacting an aqueous solution of metal salts with a quaternary ammonium carbonate with formation of a carbonate precipitate and recovering the precipitate; the improvement comprising dispersing the recovered precipitate in water to a theoretical carbonate: water (g:ml) ratio of about 1:300–1,500, thereby forming a slurry of carbonate particles, and spray-drying said slurry, thereby forming particles having volume median particle size less than 1 micron.

2. Process according to claim 1, wherein the theoretical carbonate:water ratio is about 1:500–700.

3. The process of claim 2, wherein the spray dried product is precalcined in air at about 540° C. for about 5 hours.

4. A process for forming metal oxide particles having a volume median particle size less than 1 micron comprising:
   (a) forming a water insoluble carbonate precipitate by reacting in water at least one water soluble salt of metals selected from the group consisting of elements with atomic numbers 57–71 inclusive, Be, Mg, Ca, Sr, Ba, Cu, Ag, Mn, Fe, Co, Ni, Zn, Cd, Hg, Pb, Bi, Sc, Y, and Zr; with a quaternary ammonium carbonate at a pH in the range of about 7.5–12;
   (b) recovering the carbonate precipitate;
   (c) dispersing the carbonate precipitate in water to form a slurry having a theoretical carbonate:water (g/ml) ratio of about 1:300–1,500;
   (d) spray-spraying the slurry to give a spray-dried product;
   (e) precalcining the spray-dried product at about 500°–600° C. for about 3–10 hours; and
   (f) calcining the precalcined product to form said oxide particles.

5. Process according to claim 4, wherein the clacination whereby the product is converted to oxide particles is conducted according to the following schedule:
   (1) heating in an atmosphere consisting of about 0.2–20 Torr oxygen, from room temperature to about 650°–750° C., over a period of about 5–10 hours;
   (2) continuing heating under 0.2–20 Torr oxygen while increasing the temperature by about 25°–100° C. over a period of about 3–8 hours up to a temperature sufficiently high to form said oxide, but not so high as to cause the product to agglomerate into particles that have a mean particle size above 1 micron;
   (3) holding the furnace at said increased temperature under 0.2–20 Torr oxygen for about 2–8 hours;
   (4) allowing the furnace to cool in oxygen at atmospheric pressure down to about 300°–400° C. over a period of about 5–15 hours; and then
   (5) allowing the furnace to cool to room temperature under 1 atmosphere of oxygen.

6. The process of claim 5 wherein the metals are Y, Ba and Cu and said oxide formed is $YBa_2Cu_3O_x$ where x is about 6.

7. Process according to claim 6, wherein,
   in (1), oxygen is about 2 Torr, temperature is about 700° C., and the period is about 7 hours;
   in (2), oxygen is about 2 Torr; temperature is increased to about 750° C.;
   in (3), oxygen is about 2 Torr; the holding time is about 4 hours; and
   in (4), the temperature is about 350° C. for about 8 hours.

8. Process according to claim 1, wherein the metal salt or salts is/are selected from the groups consisting of elements
   with atomic numbers 57–71 inclusive, and Be, Mg, Ca, Sr, Ba, Cu, Ag, Mn, Fe, Co, Ni, Zn, Cd, Hg, Pb, Bi, Sc, Y, and Zr.

9. Process according to claim 8, wherein the salts comprise salts of Y, Ba, and Cu.

10. Process according to claim 9, wherein the Y:Ba:Cu atomic ratio is substantially 1:2:3.

11. Process according to claim 9, wherein the Y:Ba:Cu atomic ratio is substantially 1:2:4.

* * * * *